United States Patent
Fogg et al.

(10) Patent No.: US 7,471,072 B2
(45) Date of Patent: Dec. 30, 2008

(54) SWITCHED MODE POWER SUPPLY HAVING VARIABLE MINIMUM SWITCHING FREQUENCY

(75) Inventors: John Kenneth Fogg, Cary, NC (US); Yin-Chih Yang, Taipei (TW)

(73) Assignee: Semtech Corporation, Morrisville, NC (US)

( * ) Notice: Subject to any disclaimer, the term of this patent is extended or adjusted under 35 U.S.C. 154(b) by 96 days.

(21) Appl. No.: 11/549,744

(22) Filed: Oct. 16, 2006

(65) Prior Publication Data

US 2008/0088289 A1   Apr. 17, 2008

(51) Int. Cl.
G05F 1/575   (2006.01)
G05F 1/618   (2006.01)

(52) U.S. Cl. .................................. 323/284; 323/285

(58) Field of Classification Search ................ 323/222, 323/223, 224, 265, 271, 282, 284, 285, 351
See application file for complete search history.

(56) References Cited

U.S. PATENT DOCUMENTS

| | | | | |
|---|---|---|---|---|
| 5,912,552 A | * | 6/1999 | Tateishi | 323/285 |
| 5,920,475 A | * | 7/1999 | Boylan et al. | 363/127 |
| 6,366,070 B1 | * | 4/2002 | Cooke et al. | 323/284 |
| 6,396,252 B1 | * | 5/2002 | Culpepper et al. | 323/285 |
| 6,894,471 B2 | * | 5/2005 | Corva et al. | 323/282 |
| 7,245,113 B2 | * | 7/2007 | Chen et al. | 323/271 |
| 7,250,746 B2 | * | 7/2007 | Oswald et al. | 323/284 |
| 7,298,124 B2 | * | 11/2007 | Kan et al. | 323/283 |
| 7,317,305 B1 | * | 1/2008 | Stratakos et al. | 323/282 |

\* cited by examiner

*Primary Examiner*—Gary L Laxton
(74) *Attorney, Agent, or Firm*—Coats & Bennett, P.L.L.C.

(57) ABSTRACT

In a switched mode power supply (SMPS) then selectively operates in continuous current mode (CCM) and discontinuous current mode (DCM), the minimum switching frequency of the SMPS is adjusted by setting a minimum duration for DCM operation. A resistance value applied to an external pin of the SMPS controls the duration of a timer that is reset in CCM and activated upon entering DCM. Upon expiration of the variable duration, the SMPS reverts to CCM for at least one switching cycle. This allows the SMPS minimum effective switching frequency to be set, for each application in which the SMPS is deployed, at a level that avoids audible noise (but which may be lower than an ultrasonic frequency), thus taking maximum advantage of the efficiencies of DCM operation under light load conditions.

19 Claims, 5 Drawing Sheets

SWITCHED MODE POWER SUPPLY HAVING VARIABLE MINIMUM SWITCHING FREQUENCY

BACKGROUND

The present invention relates generally to the field of switched-mode power supplies and in particular to a switched-mode power supply having a variable minimum switching frequency.

Numerous mechanisms exist for implementing switched mode power supplies (SMPSs). The use of a switched inductor output circuit stands as a non-limiting example of one common implementation. In switched inductor topologies, the SMPS actively regulates its output voltage by switching the output inductor into and out of electrical connection with a supply voltage according to some form of regulation error feedback signal or other regulation control signal. When the inductor maintains continuous current as it is switched into and out of connection with the supply, the power supply is said to be operating in Continuous Conduction Mode (CCM).

SMPSs can improve their overall operating efficiencies by operating in "discontinuous conduction mode" (DCM) under certain load conditions. For example, a given SMPS may be configured to enter DCM responsive to detecting zero or negative current in the inductor. In other words, when the load current drawn from the SMPS falls to a light level, the SMPS may improve its overall operating efficiency by suspending active regulation switching operations, thus reducing switching losses. The SMPS thus effectively turns its switched output off and allows the load to "float." CCM operation may be re-entered responsive to, e.g., the value of the output voltage.

Copending U.S. patent application Ser. No. 11/387,943, "Switched Mode Power Supply Method and Apparatus," assigned to the assignee of the present application and incorporated by reference herein in its entirety, discloses a SMPS having "smart" output voltage regulation in DCM, whereby the floating load voltage is monitored, and regulated by entering CCM or activating an output voltage pull-down if the voltage exceeds one or more predetermined thresholds.

Under light loads, where the SMPS may operate primarily in DCM, entering CCM relatively infrequently, the effective switching frequency may be reduced to less than 20 kHz, which is within the range of human hearing (roughly 20 Hz-20 kHz). In some applications, the SMPS output switching may cause mechanical vibrations in one or more circuit components, generating objectionable audible noise. One way to eliminate this possibility is to restrict the minimum switching frequency to a value in the ultrasonic range, such as 25 kHz or above. However, this limits the efficiency benefits that can be achieved by DCM under light load conditions by operating at frequencies below ultrasonic.

SUMMARY

The minimum switching frequency of a switched mode power supply (SMPS) is adjusted by setting a maximum duration for switching cycles in DCM operation. A resistance value applied to an external pin of the SMPS controls the duration of a timer that is reset in CCM and activated upon entering DCM. Upon expiration of the variable duration, the SMPS reverts to CCM for at least one switching cycle. This allows the SMPS minimum effective switching frequency to be set, for each application in which the SMPS is deployed, at a level that avoids audible noise (which may be lower than an ultrasonic frequency), thus taking maximum advantage of the efficiencies of DCM operation under light load conditions.

In one aspect, the present invention relates to a switched mode power supply (SMPS). The SMPS includes a regulation circuit configured to operate selectively in a discontinuous conduction mode (DCM) and in a continuous conduction mode (CCM). The SMPS also includes a timer activated upon the regulation circuit entering DCM and indicating a variable duration. The SMPS additionally includes a control circuit configured to monitor an output voltage of the switched mode power supply circuit and the timing circuit during DCM operation of the regulation circuit, and revert the regulation circuit to CCM operation responsive to the earlier of the output voltage reaching a defined voltage limit or the duration elapsing.

In another aspect, the present invention relates to a method of controlling a switched mode power supply (SMPS) that selectively operates in a continuous conduction mode (CCM) and a discontinuous conduction mode (DCM) to regulate an output voltage. The current in a switching circuit inductor associated with the output voltage is monitored. The SMPS is switched from CCM to DCM operation in response to detecting zero or negative inductor current. The output voltage is monitored, and the SMPS is switched from DCM to CCM operation in response to detecting the output voltage at or below a reference voltage level. The time the SMPS operates in DCM is monitored, and after a variable duration of operation in DCM, the SMPS is switched from DCM to CCM operation.

In yet another aspect, the present invention relates to a method of maximizing the efficiency of a switched mode power supply while suppressing audible noise generated by the power supply. The switched mode power supply is selectively operated in a continuous conduction mode (CCM) and a discontinuous conduction mode (DCM) as a function of load conditions. The duration that the switched mode power supply operates in DCM is monitored. The switched mode power supply is reverted from DCM operation to CCM operation after a variable duration so as to establish a minimum effective switching frequency sufficiently high to avoid audible noise generation.

In still another aspect, the present invention relates to a method of operating a switched mode power supply. An output voltage is regulated in response to load conditions by switching an inductor circuit between a supply voltage and ground at a switching frequency. Under light loading conditions, the switching frequency is reduced down to a variable minimum switching frequency sufficiently high to avoid audible noise generation.

DETAILED DESCRIPTION

Figure 1:
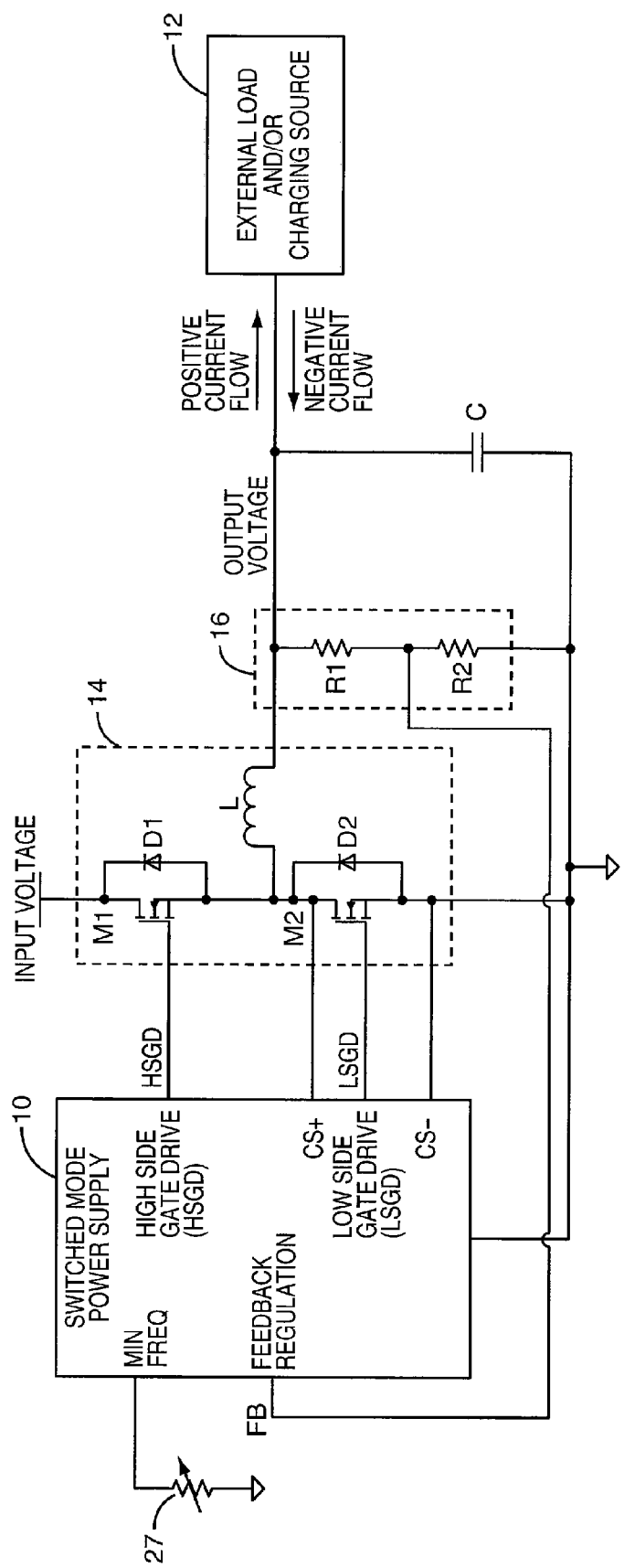
FIG. 1 is a functional block diagram of a switched mode power supply.

FIG. 1 illustrates a switched mode power supply (SMPS) 10 that is configured to provide power to an external load 12 at a regulated output voltage. To that end, the SMPS 10 controls an inductive switching circuit 14 that comprises transistor switches M1 and M2, diodes D1 and D2, which may be integral with M1 and M2, and a switched inductor L. A feedback circuit 16 provides regulation control feedback for the SMPS circuit 10 and, in the illustrated embodiment, comprises a voltage divider formed by resistors R1 and R2. The center tap of the voltage divider provides a feedback signal (FB) to a regulation feedback input of the SMPS 10.

The SMPS 10 selectively operates in Continuous Conduction Mode (CCM), wherein it drives the switching circuit 14 to maintain either M1 or M2 on at all times, or in Discontinuous Conduction Mode (DCM), wherein it generally turns both M1 and M1 off in the switching circuit 14. DCM mode offers power savings by avoiding the gate charge losses associated with the switching and may be used, for example, at times when the current into the load 12 is less than the ripple current.

Figure 2:
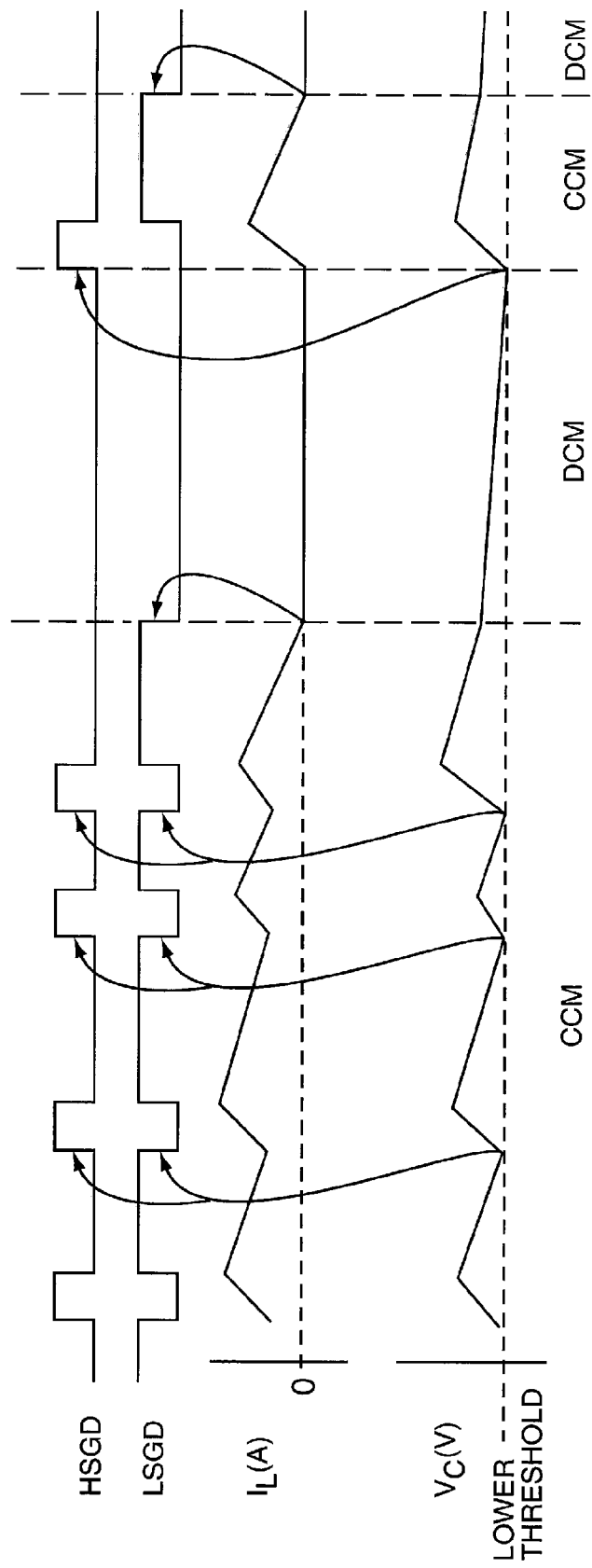
FIG. 2 is a timing diagram showing CCM and DCM operation.

The operation of one embodiment of the SMPS 10 is depicted in the timing diagram of FIG. 2. In this embodiment, in CCM operation, the high side gate drive (HSGD) "on" duration is fixed, and the low side gate drive (LSGD) is driven in response to a comparison between the output voltage $V_C$ (as seen at the output capacitor) and a lower voltage threshold. In particular, when $V_C$ reaches the lower threshold, the LSGD turns off and the HSGD turns on, charging the output capacitor, through the switching inductor, from the voltage source. After a fixed HSGD duration, the HSGD turns off and the LSDG turns on, drawing current from ground through the switch M2. As well known by those of skill in the art, in other embodiments of the SMPS 10, the HSGD duration or on-time and LSGD duration or off-time can be generated by alternate control schemes.

As depicted in FIG. 2, when the inductor current $I_L$ is near zero, the SMPS 10 transitions to DCM operation, with neither the HSGD nor the LSGD being driven. The output voltage thus "floats," and will generally decay slowly via leakage currents (although, particularly if $I_L$ is negative, $V_C$ may rise, requiring regulation as described in the application Ser. No. 11/387,943 incorporated above). When the output voltage $V_C$ reaches the lower threshold, it triggers HSGD to turn on, charging the output capacitor, as shown.

In general, under light load conditions, the output voltage $V_C$ in DCM may remain above the lower voltage threshold for relatively long durations, resulting in no switching activity. This reduces the overall effective switching frequency of the SMPS 10. In particular, it may reduce the switching frequency into the human audible range, i.e., below 20 kHz. In some applications, this may induce vibrations in components or other mechanical devices, generating an objectionable, audible noise. This effect, however, depends almost entirely on the specific configuration of components in each particular application in which the SMPS 10 is deployed.

As used herein, a "light load" or "light load current" refers to little or zero inductor current $I_L$. For example, in one embodiment a light load may comprise any inductor current $I_L$ that is 30% or less of the maximum output current. In general, a light load may be defined as inductor current $I_L$ less than a predetermined threshold.

In some applications, no audible noise is generated as the SMPS 10 switching frequency drops all the way to DC. In other applications, an audible noise may be detected as soon as the SMPS 10 switching frequency drops below 20 kHz. In still other applications, an audible noise may be generated only at specific frequencies, for example 9.5 kHz. Accordingly, using the "brute force" approach to noise abatement of restricting the SMPS 10 switching frequency to the ultrasonic range (i.e., 25 kHz or above), while effective in all cases, fails to capitalize on the power savings and increased efficiency of operating the SMPS 10 at lower switching frequencies in applications where noise is only generated at lower frequencies, or not at all.

Figure 3:
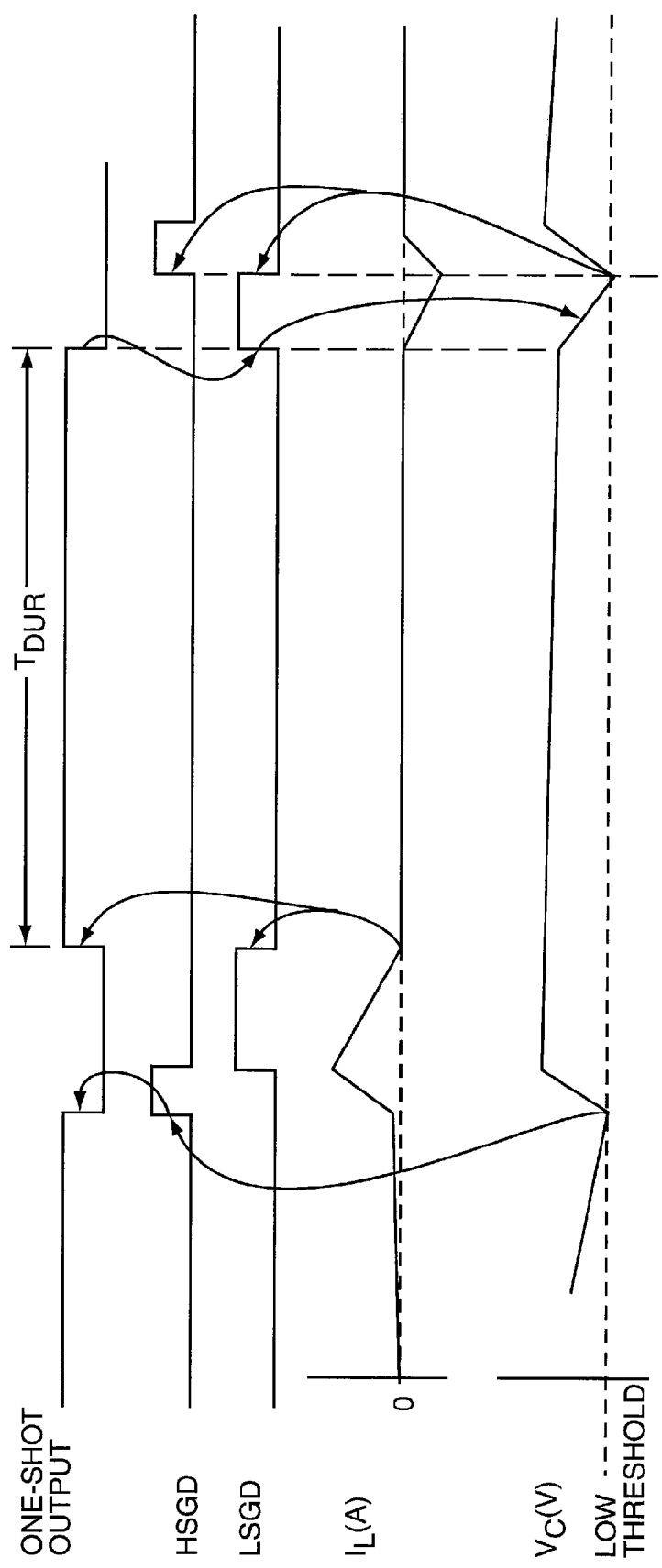
FIG. 3 is a timing diagram showing a transition from DCM to CCM operation in response to the expiration of a variable duration.

FIG. 3 depicts operation of the SMPS 10 in which the minimum switching frequency is controlled by forcing the SMPS 10 out of DCM operation after a variable duration. Initially, both the HSGD and LSGD are off, and the SMPS 10 is in DCM operation. The output voltage $V_C$ decays to the lower threshold, initiating a CCM switching cycle and resetting a timer. As the inductor current $I_L$ drops to or near zero, the SMPS 10 reverts to DCM operation, with both HSGD and LSGD off, and the timer is activated. The output voltage $V_C$ decays only slightly, and does not cross the lower threshold prior to the expiration of a variable duration, marked by the deassertion of the timer output. This event causes the LSGD to turn on, pulling the output voltage $V_C$ quickly to the lower threshold, which forces another SMPS 10 switching cycle, recharging the output capacitor.

According to one or more embodiments of the present invention, the minimum effective SMPS 10 switching frequency is variable, and in one embodiment is set by a current generated by connecting a resistance value between an external pin of the SMPS 10 and ground. This current (in effect, the resistance value) alters the duration of a timer that limits DCM operation. In one embodiment, the timer is a monostable multivibrator, also known in the art as a "one-shot" timer. The timer may be activated upon each transition from CCM to DCM. If the SMPS 10 does not return to CCM operation (such as by the output voltage $V_C$ crossing the lower threshold) prior to the expiration of the one-shot duration, the SMPS 10 transitions from DCM to CCM for at least one switching cycle.

Figure 4:
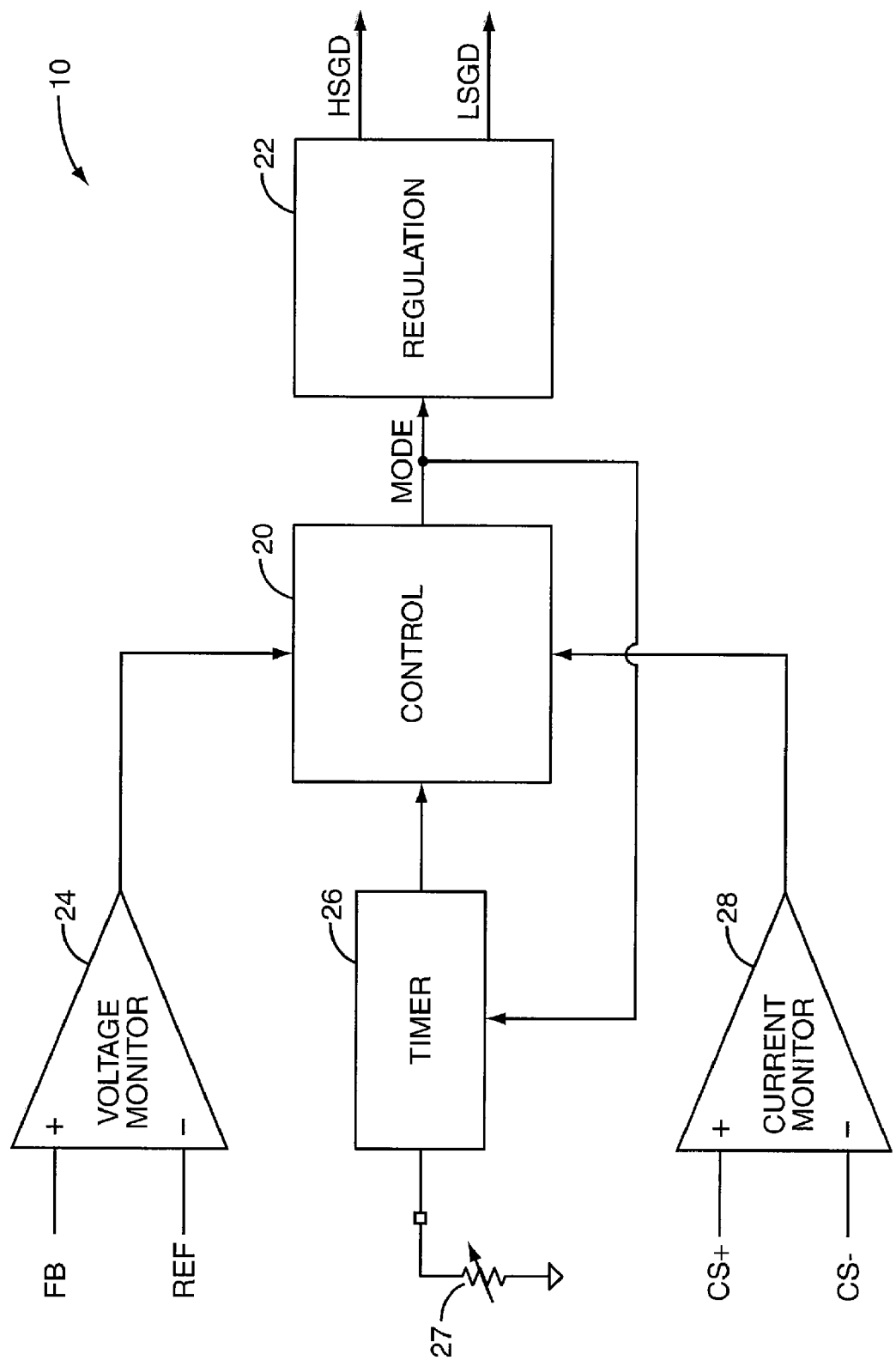
FIG. 4 is a block diagram depicting functional blocks of a switched mode power supply.

FIG. 4 depicts a functional block diagram of the SMPS 10, according to one embodiment. Control logic 20 directs a regulation circuit 22 to generate HSGD and LSGD signals to drive the switching circuit 14 in CCM or DCM. The control logic 20 receives an input from a voltage monitor 24 that detects when the output voltage $V_C$ reaches or crosses the lower voltage threshold, by comparing a proportional voltage generated by the feedback circuit 16 to an appropriate reference value. The output of the voltage monitor indicates that the control logic 20 should direct the regulation circuit 22 to transition from DCM to CCM for at least one switching cycle. Note that additional voltage monitoring circuits 24 may be included, such as in embodiments of the present invention that use CCM regulation to guard against overvoltage in DCM.

The control logic 20 additionally receives an output from a timer 26 that generates a signal indicative of a variable duration. The variable duration is determined by the value of a resistor 27 connected between an external pin of the SMPS 10 and ground. The resistor 27 may be variable, as depicted, or fixed on-chip or externally. A variable resistor 27 may be utilized during initial testing of an application in which the SMPS 10 is deployed, to ascertain whether, and at what switching frequency, audible noise is generated. Once a particular application has been characterized as to audible SMPS 10 switching noise, fixed resistors 27 having an appropriate resistance value would be utilized in production, to minimize costs.

The timer 26 additionally receives the mode output of the control logic 20. The timer is reset when the regulation circuit 22 enters CCM and performs one or more switching cycles, and is activated upon entering DCM, when the switching cycles are suppressed. As discussed above, the expiration of the variable duration indicates that the control logic 20 should direct the regulation circuit 22 to enter CCM operation for at least one switching cycle. Altering the variable duration indicated by the timer 26 (via the resistor 27) alters the effective minimum switching frequency of the SMPS 10.

The control logic 20 also receives an input from a current monitor 28 that detects zero-crossings of the switching inductor current $I_L$. In one embodiment, the current monitor 28 compares the CS+ and CS− signals tapping current on either side of the M2 switching transistor and diode. At light load currents $I_L$ indicate that the control logic 20 should direct the regulation circuit 22 to enter DCM operation.

Figure 5:
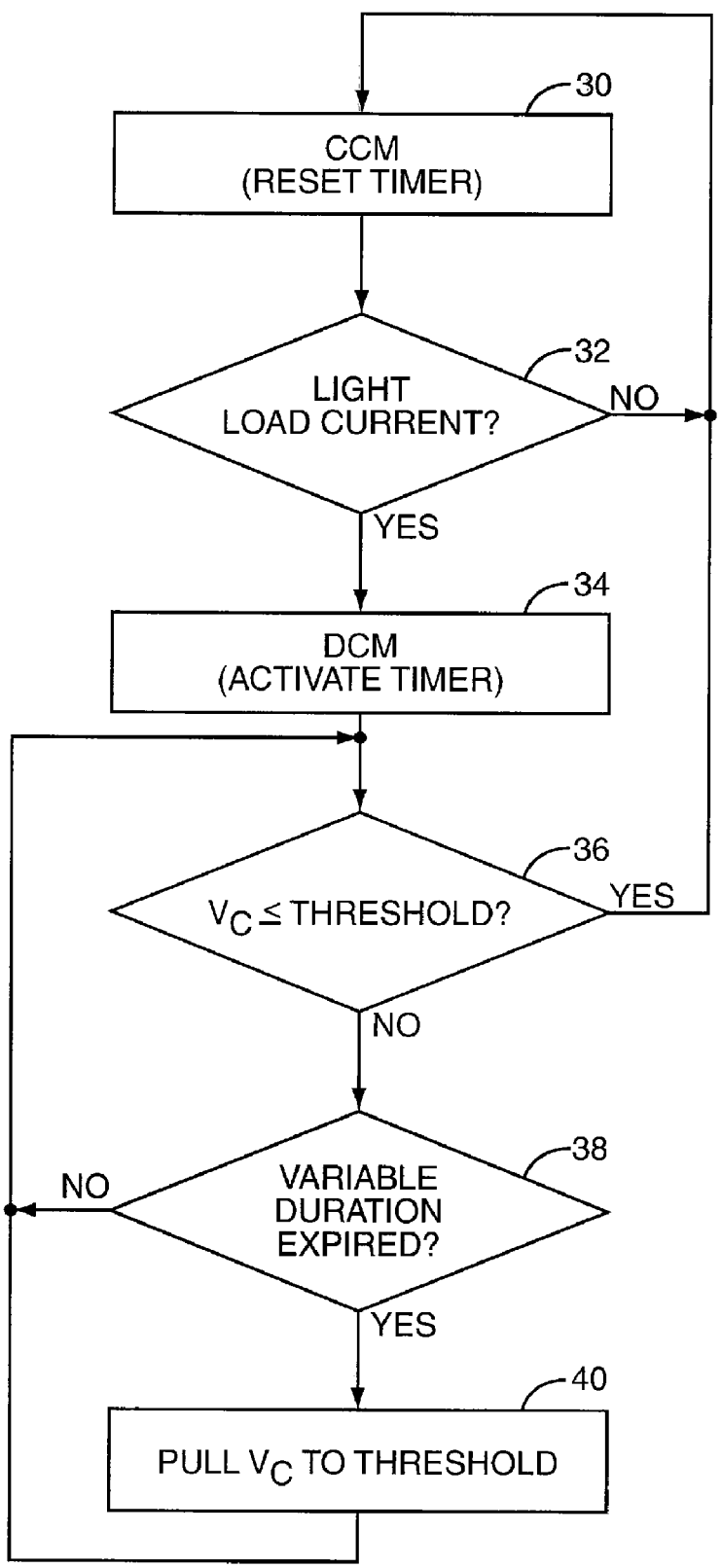
FIG. 5 is a flow diagram depicting control of a switched mode power supply.

FIG. 5 illustrates a method of SMPS 10 mode control that may be implemented by processing logic included in the SMPS circuit 10. Such logic may comprise hardware-based processing logic, software/firmware based processing logic, or any combination thereof.

The illustrated processing may be understood as representing ongoing control processing, but for purposes of discussion, processing "begins" with the SMPS 10 operating in CCM (block 30). The switching inductor current $I_L$ is monitored, such as by the current monitor circuit 28. If $I_L$ is high (block 32), CCM operation is maintained (block 30). If the switching inductor current $I_L$ is light (block 32), the control logic 20 directs the regulation circuit 22 to transition to DCM operation (block 34). The timer 26 is activated.

The output voltage $V_C$ and a variable duration are monitored during DCM operation, as indicated in FIG. 5 by a loop formed by following the "NO" outputs of decision blocks 36 and 38. In particular, as long as the output voltage $V_C$ remains above the lower threshold (block 36) and the variable duration has not expired (block 38), the SMPS 10 remains in DCM operation. If the output voltage $V_C$ drops to the lower threshold (block 36), the control logic 20 directs the regulation circuit 22 to enter CCM operation (block 30). If, on the other hand, the output voltage $V_C$ remains above the lower threshold (block 36), but the variable duration expires (block 38), as may be indicated by an output of the timer 26, the control logic 20 may direct the regulation circuit 22 to turn on the LSGD signal, closing M2 and pulling $V_C$ down to the lower voltage threshold (block 40). Alternatively, another circuit may be used to discharge the output capacitor and pull down the output voltage. The voltage monitor circuit 24 detects that the output voltage $V_C$ is at or below the lower threshold (block 36), and in response the control logic 20 directs the regulation circuit 22 to enter CCM operation (for at least one switching cycle). The timer 26 is reset.

With the above details and examples in mind, those skilled in the art will appreciate that the disclosed SMPS 10 overcomes a significant problem associated with traditional SMPS circuits offering DCM operation by providing for a variable minimum switching frequency that can be tuned to the audible characteristics of each application in which the SMPS is deployed. Broadly, the SMPS 10 embodies a method and apparatus capable of capitalizing on the efficiency benefits of DCM operation under light load conditions well into the audible range by controlling the minimum switching frequency.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A switched mode power supply comprising:
    a regulation circuit configured to operate selectively in a discontinuous conduction mode (DCM) and in a continuous conduction mode (CCM);
    a timer activated upon the regulation circuit entering DCM and indicating a variable duration; and
    control logic configured to monitor an output voltage of the switched mode power supply circuit and the timing circuit during DCM operation of the regulation circuit, and revert the regulation circuit to CCM operation responsive to the earlier of the output voltage reaching a defined voltage limit or the duration elapsing.

2. The switched mode power supply circuit of claim 1 wherein the timer comprises a monostable multivibrator.

3. The switched mode power supply circuit of claim 1 wherein the variable duration is determined by a resistance value applied to the timer.

4. The switched mode power supply of claim 1, wherein the control logic is further configured to return the regulation circuit to DCM operation based on monitoring inductor current in a switching circuit inductor associated with the output voltage.

5. The switched mode power supply of claim 1, wherein the control logic is further configured to return the regulation circuit to DCM operation responsive to detecting that the inductor current falls below a predetermined threshold.

6. The switched mode power supply of claim 1, wherein the control logic comprises a voltage monitoring circuit to monitor the output voltage, a timer monitoring circuit to monitor the timer output, and a current monitoring circuit to monitor inductor current in a switching circuit inductor associated with the output voltage, and wherein the control circuit reverts the regulation circuit to CCM operation responsive to one of the voltage monitoring circuit or timer monitoring circuit, and returns the regulation circuit to DCM operation responsive to the current monitoring circuit.

7. The switched mode power supply of claim 6, wherein the voltage monitoring circuit compares the output voltage to a threshold voltage greater than a target output voltage.

8. The switched mode power supply of claim 6, wherein the voltage monitoring circuit compares the output voltage to a threshold voltage less than a target output voltage.

9. A method of controlling a switched mode power supply (SMPS) that selectively operates in a continuous conduction mode (CCM) and a discontinuous conduction mode (DCM) to regulate an output voltage, comprising:
    monitoring the current in a switching circuit inductor associated with the output voltage;
    switching the SMPS from CCM to DCM operation in response to detecting inductor current below a predetermined threshold;
    monitoring the output voltage;
    switching the SMPS from DCM to CCM operation in response to detecting the output voltage at or below a reference voltage level;
    monitoring the time the SMPS operates in DCM; and
    after a variable duration of operation in DCM, switching the SMPS from DCM to CCM operation.

10. The method of claim 9 wherein switching the SMPS from DCM to CCM operation after a variable duration of operation in DCM comprises pulling the output voltage to or below the reference voltage level following the expiration of the variable duration.

11. The method of claim 9 further comprising fixing the variable duration prior to operation of the SMPS.

12. The method of claim 11 wherein fixing the variable duration comprises applying a predetermined resistance value to a timing circuit in the SMPS.

13. The method of claim 12 wherein the timing circuit comprises a monostable multivibrator.

14. The method of claim 11 wherein fixing the variable duration comprises fixing the duration to a value short enough to avoid audible noise from the SMPS.

15. A method of maximizing the efficiency of a switched mode power supply while suppressing audible noise generated by the power supply, comprising:
    selectively operating the switched mode power supply in a continuous conduction mode (CCM) and a discontinuous conduction mode (DCM) as a function of load conditions;
    monitoring the duration that the switched mode power supply operates in DCM; and
    reverting the switched mode power supply from DCM operation to CCM operation after a variable duration so as to establish a minimum effective switching frequency sufficiently high to avoid audible noise generation.

16. The method of claim 15 wherein the duration is established by a resistance value applied to a timer in the switched mode power supply.

17. The method of claim 16 further comprising varying the resistance value for each application in which the switched mode power supply is deployed to achieve the lowest effective switching frequency that avoids audible noise generation.

18. The method of claim 16 wherein the timer comprises a monostable multivibrator.

19. The method of claim 15 further comprising transitioning the switched mode power supply from CCM operation to DCM operation in response to the load current in a switching circuit inductor associated with the output voltage.

* * * * *